US005162138A

United States Patent [19]

Caflisch et al.

[11] Patent Number: 5,162,138

[45] Date of Patent: Nov. 10, 1992

[54] PUMPKIN DECORATIONS

[75] Inventors: Sandra E. Caflisch, Prior Lake; Brenda J. Wellman, Becker, both of Minn.

[73] Assignee: Two Creative Inc., Prior Lake, Minn.

[21] Appl. No.: 681,950

[22] Filed: Apr. 8, 1991

[51] Int. Cl.[5] ........ A01N 3/00; B32B 7/12

[52] U.S. Cl. ........ 428/17; 428/16; 428/22; 428/343; 426/383

[58] Field of Search ........ 428/17, 343, 16, 22; 426/383

[56] References Cited

U.S. PATENT DOCUMENTS

| | | | |
|---|---|---|---|
| Re. 29,663 | 6/1978 | Theissen | 428/336 |
| 2,082,671 | 6/1937 | Walker | 426/383 X |
| 2,096,507 | 10/1937 | Czeszcziczki, Jr. | 428/17 X |
| 3,331,729 | 7/1967 | Danielson et al. | 161/162 |
| 3,365,315 | 1/1968 | Beck et al. | 106/40 |
| 3,413,168 | 11/1968 | Danielson et al. | 156/71 |
| 4,095,013 | 6/1978 | Burger | 428/335 X |
| 4,287,013 | 9/1981 | Ronning | 156/242 |
| 4,348,455 | 9/1982 | Clayton | 428/216 X |
| 4,391,646 | 7/1983 | Howell | 106/97 |
| 4,652,239 | 3/1987 | Brimberg | 434/80 |
| 4,676,376 | 6/1987 | Keiswetter | 206/494 |
| 4,684,264 | 8/1987 | Paperno et al. | 368/283 |
| 4,862,944 | 9/1989 | Hendershot | 160/370 |
| 4,879,161 | 11/1989 | Raymond et al. | 428/195 |
| 4,900,604 | 2/1990 | Martinez et al. | 428/39 X |
| 4,905,298 | 2/1990 | Walor | 383/95 |

*Primary Examiner*—George F. Lesmes
*Assistant Examiner*—D. R. Zirker
*Attorney, Agent, or Firm*—Palmatier & Sjoquist

[57] ABSTRACT

A pumpkin decoration wherein a first decorative piece of vinyl sticks via an adhesive to the pumpkin and a second decorative piece of static cling material clings via static cling to the first piece. Third and fourth pieces of static cling material may also cling to the second piece and to each other such that a number of designs may be created. The first decorative piece of vinyl includes an adhesive which is pressure-sensitive such that the first piece may be repeatedly removed and reapplied to the pumpkin.

9 Claims, 1 Drawing Sheet

PUMPKIN DECORATIONS

BACKGROUND OF THE INVENTION

Historically, the autumn festival Halloween can be traced back more than 2,000 years to the Celts who occupied what is presently Great Britain, Ireland, and northern France. The Celts and their descendants carved out turnips, beets, or potatoes to use as lanterns, or jack-o'-lanterns, on Halloween. These vegetables were replaced by the native pumpkin in the United States.

For Halloween, children typically carve out pumpkins to reflect the appearance of a face. A candle may be fixed inside to illuminate the carved-out pumpkin. Pumpkin-sized flashlights instead of candles now frequently are placed inside of pumpkins for safety purposes.

SUMMARY OF THE INVENTION

A feature of the present invention is the provision in a decoration of an outside of an edible object, of a first decorative piece which includes adhesive for being attached to the exterior of the object and which is receptive to static cling material, and a second decorative piece which includes static cling material for clinging to the first decorative piece such that the second piece is readily orientable relative to the first piece in a variety of positions.

Another feature is the provision in such a decoration, of a third decorative piece including static cling material which clings via static cling to the second piece such that the third piece is readily orientable relative to the second piece in a variety of positions.

Another feature is the provision in such a decoration, of a fourth decorative piece including static cling material for clinging via static cling to the third piece such that the fourth piece is readily orientable relative to the second piece.

Another feature is the provision in such a decoration, of the adhesive being pressure-sensitive such that the degree of adhesion between the first decorative piece and the edible object varies with pressure applied to the first piece when the first piece is being positioned on the pumpkin.

Another feature is the provision in such a decoration, of the edible object being a pumpkin.

Another feature of the present invention is the provision in a decoration for an object, of a first decorative piece which includes a pressure-sensitive adhesive for precise positioning of the first decorative piece and which is receptive to static cling material, and a second decorative piece of static cling material clingable to the first decorative piece such that the second piece is readily orientable relative to the first piece in a variety of positions.

An advantage of the present invention is that pumpkins may be decorated without carving and subsequent illumination such as with candles. Hence, such a decorative pumpkin is safe for display where children may approach to trick-or-treat. Moreover, the inside of the pumpkin need not be cleared of seeds and its attendant messy string-like matter. Furthermore, an uncarved pumpkin rots less quickly.

Another advantage is that a variety of decorations may be formed from one set of decorative pieces.

Another advantage is that the underlying adhesive decorative piece is removable and re-attachable to the face of the pumpkin a great number of times while retaining its adhesive qualities.

Another advantage is that the decorative pieces may be used on gourds or eggs, both of which are conventionally decorated such as by painting.

Another advantage is that the decorative pieces are inexpensive and simple to use.

DETAILED DESCRIPTION OF THE PREFERRED EMBODIMENT

Figure 1:
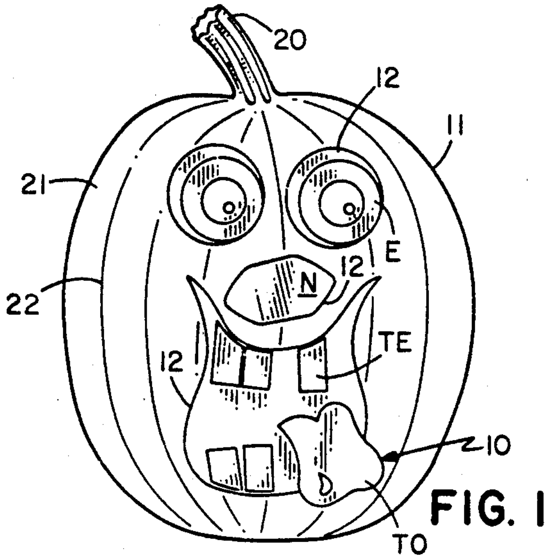
FIG. 1 is an elevation view of the present decoration on a pumpkin.

As shown in FIG. 1, the present pumpkin decoration is indicated in general by the reference numeral 10. The decoration 10 is typically utilized to decorate a pumpkin 11. The decoration 10 includes as its principal components a first decorative piece 12 with a pressure sensitive adhesive for adhering to the pumpkin 11, and second, third, and fourth decorative pieces 13, 14, 15 of static cling material for clinging via static to the first piece 12 and to each other. Static cling may also be referred to as electrostatic cling.

The electrostatic or static cling property may be imparted to the plastic decorative pieces 12–15 by including a high content of plasticizer in the plastic pieces 12–15. The surfaces of the decorative pieces 13–15, and the outer surface of decoration piece 12 may be somewhat porous with microscopic suction cups which may impart to the plastic the capability of sealing against smooth surfaces As to such features, U.S. Pat. No. 4,905,298 is hereby incorporated by reference.

The pumpkin 11 includes a stem 20 and a rind or exterior 21 having a number of naturally formed depressions or scores 22 in the rind 21. It should be noted that conventional static cling material such as the decorative pieces 13, 14, 15 do not adhere to the rind or exterior 21 of the pumpkin 11. Nor does conventional static cling material adhere to the exterior of other fruit such as squash, watermelon, cucumbers, apples, oranges, or to dried fruit such as gourds, or to the shell of a chicken egg, or to vegetables such as turnips, beets, or potatoes.

The first decorative piece 12 is typically a flexible vinyl film material with an inner face 30 having a pressure sensitive adhesive and a vinyl outer face 31 which is smooth and receptive to static cling material such as the second decorative pieces 13, 14, and 15. The adhesion of the first piece 12 is pressure sensitive; in other words, adhesion between the pressure sensitive adhesive of the inter face 30 and the exterior 21 of the pumpkin 11 increases with the amount of pressure brought to bear on the outer face 31 of the first piece 12.

One preferred material for the first decorative piece 12 is Controltac TM marking film available from 3M of Maplewood, Minn. Such film is a pressure-activated or pressure-sensitive positionable vinyl film. The adhesive of such film includes microscopic bubbles or balloons, some of which break or become embedded in the adhesive as pressure is applied. A greater number of bubbles break and hence adhesion or "tackiness" is increased as a greater amount of pressure is applied. U.S. Pat. Nos.

3,413,168 and 3,331,729 are hereby incorporated by reference as to such a pressure-sensitive feature.

One feature of the vinyl outer face 31 is that it provides a receptive surface to which static cling material adheres. Another feature of the vinyl face 31 is that it is smooth. It should be noted that the outer face 31 may include light reflective material.

The second, third, and fourth decorative pieces 13, 14, 15 are formed of a static cling material which adheres via static cling to the first decorative piece 12. Each of the faces of each of the second, third, and fourth decorative pieces 13, 14, 15 are smooth. The decorative pieces 13, 14, 15 are formed of plastic having static cling properties. One typical plastic is polyvinyl chloride (PVC) which may be formed with static cling properties.

Each of the second, third, and fourth decorative pieces 13, 14, 15 are flexible, light, and relatively thin. Such relative low weight allows the second, third and fourth decorative pieces 13, 14, 15 to cling to each other and to the first decorative piece 12 when the pieces 12–15 are disposed in a vertical plane or even when the pumpkin 11 is tipped such that the pieces 12–15 are disposed horizontally and in effect clinging to the underside of the pumpkin 11. Accordingly, the decoration 10 remains on a pumpkin 11 when the pumpkin 11 is carried.

Typically, three layers of static cling pieces 13-15 are utilized. However, ten layers of such static cling pieces may cling to each other and first decorative adhesive piece 12 without substantially decreasing the static cling properties. Each of the second, third and fourth decorative pieces are preferably of a thickness of approximately 1/100 of an inch.

Figure 4:
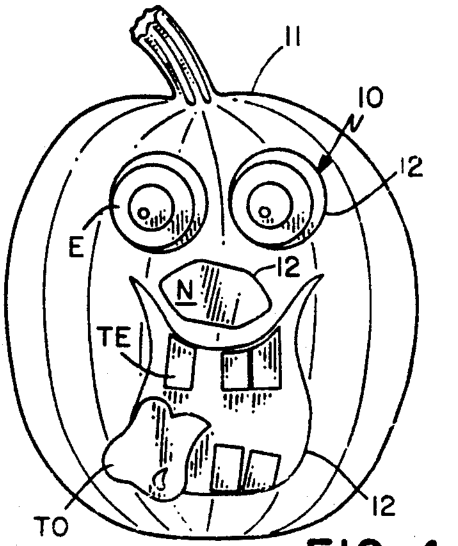
FIG. 4 is an elevation view of the decoration of FIG. 1 rearranged.
Figure 3:
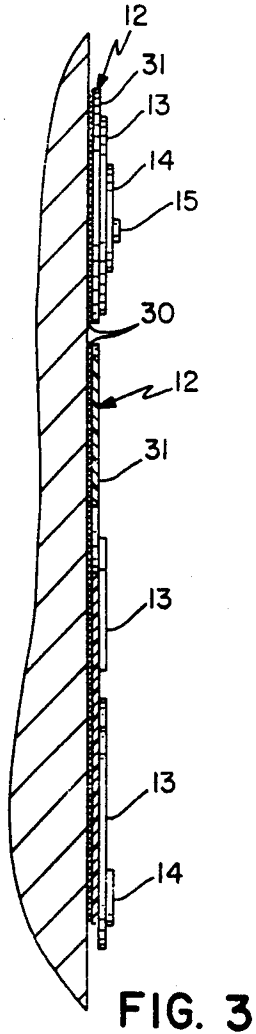
FIG. 3 is a section view at lines 3—3 of FIG. 2.
Figure 2:
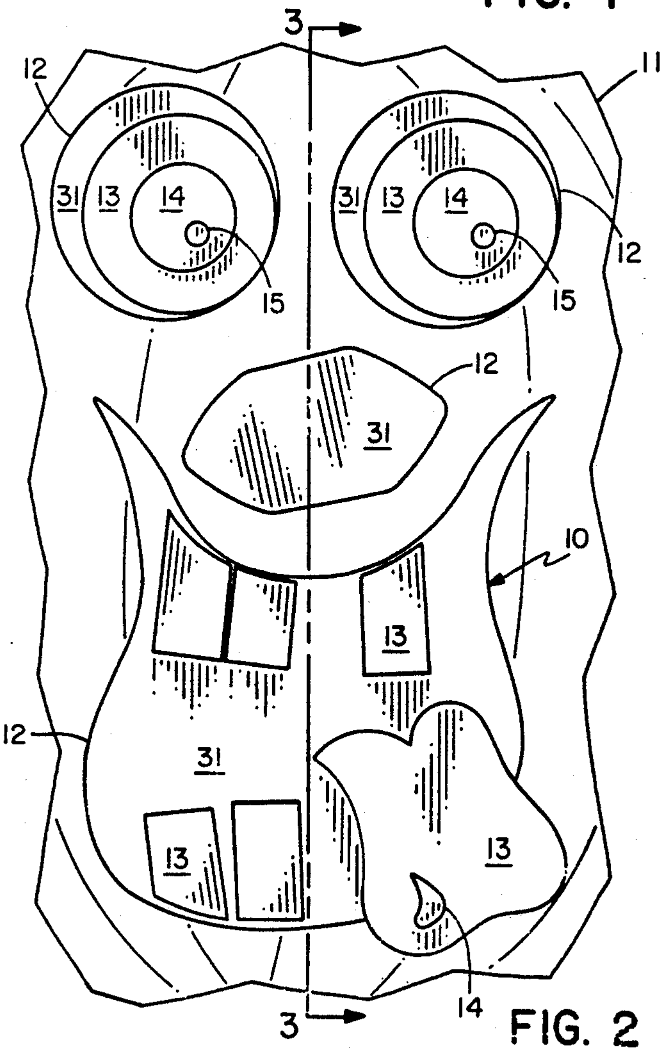
FIG. 2 is a detail elevation view of the decoration of FIG. 1.

As shown in a comparison between FIG. 1 and FIG. 4, the decorative pieces 12–15 may be rearranged. As shown by the nose decoration, indicated by the reference character N, the first decorative piece 12 is repositionable via the pressure-sensitive adhesive. As shown by the eye, teeth, and tongue decorations, designated by the reference characters E, TE, and TO, respectively, the second, third, and fourth decorative pieces 13–15 may be rearranged through their static cling properties as well as being turned over such that the opposite face clings to the first decorative piece 12 and such that mirror images are created.

In operation, the exterior 21 of the pumpkin is cleared of dirt such as by washing with soap and water. Subsequently, the first decorative pieces 12 are positioned on the exterior 21 of the pumpkin 11. The first pressure sensitive pieces 12 may be peeled off of the exterior 21 and repositioned if desired The second, third and fourth decorative pieces 13, 14, and 15 are then positioned on the first decorative pieces to form a decoration such as a face. The second, third and fourth decorative pieces 13, 14, and 15 cling to the first piece 12 and to each other through their static cling properties. Accordingly, the second, third and fourth decorative pieces 13, 14, and 15 may be repositionable.

As stated above, it should be noted that the second decorative pieces 13, 14 and 15 typically do not cling via static to edible objects such as pumpkins, squash, watermelon, cucumbers, apples, oranges, or to dried fruit such as gourds, or to the shell of a chicken's egg, or to vegetables such as turnips, beets or potatoes. The present decoration 10 may be used on each of the above edible objects.

Furthermore, the decoration 10 may be used on objects such as notebooks, or three-ring binders which may have textured exterior surfaces and which typically do not possess the requisite static cling properties.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. In combination with a pumpkin, a decoration for being applied to the exterior of the pumpkin, comprising:

a first decorative place with inner and outer faces, the inner face having a repositionable pressure sensitive adhesive layer coated thereon for repositionably adhesively engaging the exterior of the pumpkin, the first piece being receptive to static cling material, the first piece being formed of a flexible plastic material, and a second decorative piece comprising a flexible, static cling plastic material for clinging via static cling to the outer face of the first piece such that the second piece is readily orientable relative to the first piece in a variety of positions.

2. The decoration of claim 1 and further comprising a third decorative piece, the third piece comprising a flexible, static cling plastic material for clinging via static cling to an outer face of the second piece such that the third piece is readily orientable relative to the second piece in a variety of positions.

3. The decoration of claim 1 and further comprising a fourth decorative piece, the fourth piece comprising a flexible, static cling plastic material for clinging via static cling to an outer face of the second piece such that the fourth piece is readily orientable relative to the second piece in a variety of positions.

4. The decoration of claim 1, wherein the outer face of the first piece is smooth.

5. The decoration of claim 1, wherein the second piece includes a pair of faces, each of the faces being smooth.

6. The decoration of claim 1, wherein the second piece is of sufficiently low weight to cling via static in a substantially vertical orientation to the first piece.

7. The decoration of claim 1, wherein the first piece comprises vinyl.

8. The decoration of claim 1, wherein the second piece comprises vinyl.

9. In combination with a pumpkin, a decoration for being applied to the exterior of the pumpkin, comprising:

a first decorative piece with inner and outer faces, the inner face having a repositionable pressure sensitive adhesive layer coated thereon for repositionably adhesively engaging the exterior of the pumpkin, the first piece being receptive to static cling material and being formed of a flexible vinyl nonporous material, the outer face being smooth, a second decorative piece comprising a flexible, static cling plastic material for clinging via static cling to the outer face of the first piece such that the second piece is readily orientable relative to the first piece in a variety of positions, the second decorative piece having inner and outer smooth faces, a third decorative piece comprising a flexible, static cling plastic material for clinging via static cling to the outer face of the second piece such that the third piece is readily orientable relative to the second piece in a variety of positions, the third decorative piece having inner and outer smooth faces, and a fourth decorative piece comprising a flexible, static cling plastic material for clinging via static cling to the outer face of the third piece such that the fourth piece is readily orientable relative to the second piece, each of the second, third, and fourth decorative pieces being of sufficiently low weight to cling via static cling in a substantially vertical orientation to the first piece.

* * * * *

UNITED STATES PATENT AND TRADEMARK OFFICE

CERTIFICATE OF CORRECTION

PATENT NO. : 5,162,138

DATED : November 10, 1992

INVENTOR(S) : Sandra E. Caflisch, Brenda J. Wellman

It is certified that error appears in the above-identified patent and that said Letters Patent is hereby corrected as shown below:

Column 4, line 16, delete "place" and replace it with --piece--.

Column 4, line 34, delete "1" and replace it with --2--.

Column 4, line 37, delete "second" and replace it with --third--.

Signed and Sealed this

Second Day of November, 1993

Attest:

Bruce Lehman

BRUCE LEHMAN

*Attesting Officer*

*Commissioner of Patents and Trademarks*